Nov. 22, 1966          E. F. WEBB          3,286,931
NOZZLE ASSEMBLY FOR WINDSHIELD WASHER SYSTEMS
Filed Feb. 20, 1964          2 Sheets-Sheet 1
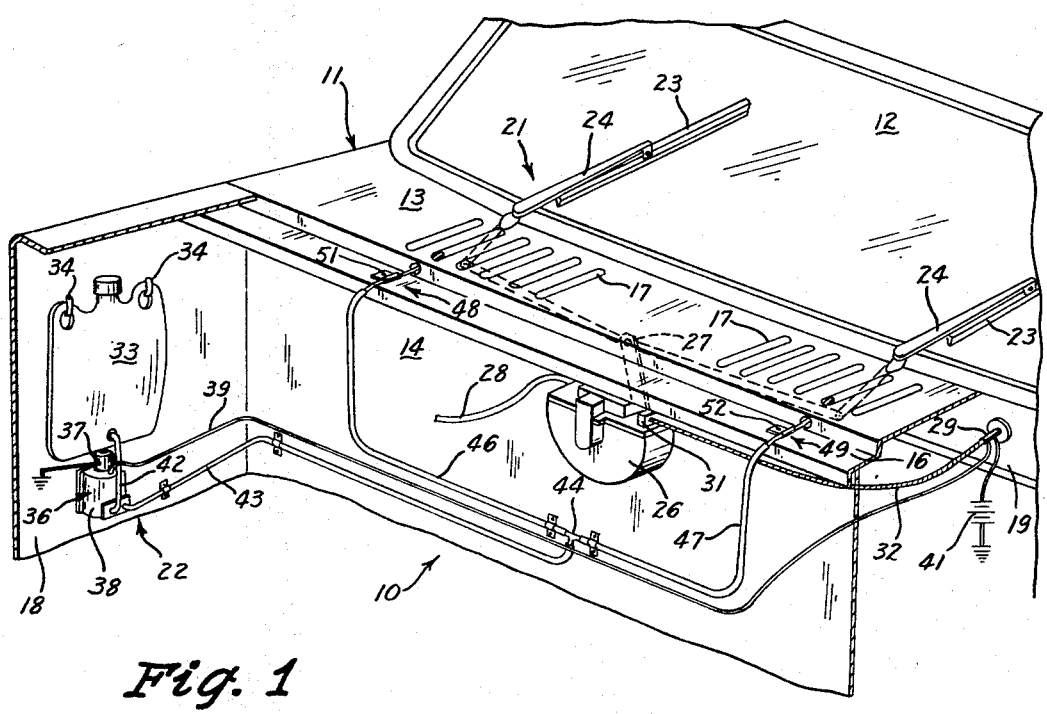
INVENTOR
EDMOND F WEBB
BY
Rudolph L. Lowell
ATTORNEY Nov. 22, 1966     E. F. WEBB     3,286,931

NOZZLE ASSEMBLY FOR WINDSHIELD WASHER SYSTEMS

Filed Feb. 20, 1964     2 Sheets-Sheet 2

INVENTOR
EDMOND F. WEBB
BY
Rudolph L. Powell
ATTORNEY

United States Patent Office 3,286,931
Patented Nov. 22, 1966

3,286,931
NOZZLE ASSEMBLY FOR WINDSHIELD WASHER SYSTEMS
Edmond F. Webb, Franklin, Mich., assignor to Putnam Equipment Corporation, Cookeville, Tenn., a corporation of Tennessee
Filed Feb. 20, 1964, Ser. No. 346,257
2 Claims. (Cl. 239—284)

This invention relates to windshield washing systems and more particularly to a nozzle assembly for directing washing fluid onto the windshield of a vehicle.

The object of this invention is to provide an improved fluid discharging nozzle assembly.

Another object of the invention is to provide a windshield washing system with at least one nozzle assembly having a replaceable and self-cleaning fluid dispensing flexible cap portion which is adjustable to change the impact location of the cleaning fluid on the windshield of a vehicle.

A further object of the invention is to provide a fluid discharging nozzle assembly having an adjustable resilient discharge cap which automatically ejects solid materials to purge the nozzle assembly of clogging solid materials.

Still another object of the invention is to provide a windshield washing system with a nozzle assembly having a flexible fluid dispensing cap which is adjustable during the dispensing of cleaning fluid onto the windshield of a vehicle to change the impact position of the cleaning fluid on the windshield.

An additional object of the invention is to provide a rugged and durable nozzle assembly which is reliable and efficient in use, and relatively simple and economical in construction and cost of installation.

Further objects, features and advantages of this invention will appear from the following description when taken in connection with the accompanying drawing, in which:

FIG. 1 is a fragmentary perspective view of a vehicle equipped with a windshield washer system having a pair of nozzle assemblies of this invention;

FIG. 2 is an enlarged perspective view of one of the nozzle assemblies of FIG. 1;

FIG. 3 is an enlarged longitudinal sectional view of an attachable fluid discharge cap in assembled relation with a tubular body member of the nozzle assembly of FIG. 2;

Figure 4:
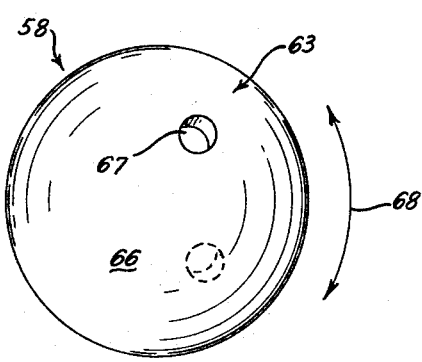
FIG. 4 is an enlarged end view looking in the direction of line 4—4 of FIG. 2.

Referring to the drawing, there is shown in FIG. 1 a windshield clearing system, indicated generally by the numeral 10, in assembled relation with a motor vehicle 11 shown in fragmentary form. The vehicle 11 has an upwardly and rearwardly extended windshield 12. Positioned adjacent the lower edge of the windshield 12 is a forwardly extended cowl 13 which is secured to a downwardly extended fire wall 14. The cowl 13 has a downwardly stepped front section 16 for accommodating the hood (not shown) of the vehicle. Extended transversely across the cowl 13 are a plurality of elongated ventilating and heater air openings 17. The opposite end sections of the cowl 13 and fire wall 14 are attached to the vehicle body side walls 18, one of which is shown. A dashboard 19 is positioned rearwardly and below the windshield 12.

The windshield clearing system 10 comprises a wiper unit and washer unit indicated generally at 21 and 22, respectively. The wiper unit 21 includes a pair of wiper elements 23 positioned in engagement with the outside surface of the windshield 12. Arms 24 support the wiper elements 23 adjacent the forward edge of the windshield 12. The wiper elements 23 and their respective arms 24 are oscillated with respect to the windshield 12 by a motor 26 connected to the arms 24 by linkage 27.

The motor 26 is illustrated as a conventional vacuum operated unit and has a hose 28 connected to the source of vacuum, such as the intake manifold of the engine. A manually operated switch 29 mounted on the dashboard 19 is connected to a motor control valve 31 by a Bowden cable 32. Linear movement of the switch 29 moves the wire of the Bowden cable 32 to actuate the control valve 31 to connect and disconnect the source of vacuum to the motor 26. When the motor 26 is connected to a vacuum pressure the linkage 27 is moved to transmit motion to the arms 24 which oscillate the wiper elements 23 over the windshield 12.

The washer unit 22 has a reservoir 33 for storing a supply of washer fluid. Brackets 34 secured to the side wall 18 support the reservoir 33 in an upright position. Mounted on the side wall 18 below the reservoir 33 is a combination motor and pump assembly 36 comprising an electric motor 37 drivably coupled to a centrifugal pump 38. A line 39 connects the electric motor 37 to a battery 41. The switch 29 includes electrical contacts (not shown) which are operable to connect and disconnect the battery and the electric motor 37. This is a manual operation which is independent of the actuation of the control valve 31 of the motor 26.

A hose 42 connects the bottom of the reservoir 33 with the intake side of the centrifugal pump 38 and functions to provide a direct fluid communication from the reservoir 33 to the pump. With the pump 38 positioned below the reservoir 33 the pump is always primed with cleaning fluid.

The outlet of the pump 38 is connected to a hose 43 positioned along the side wall 18 and fire wall 14 into a T-coupling 44 which divides the stream of cleaning fluid of the hose 43 into two separate hoses 46 and 47.

A pair of fluid dispensing nozzle assemblies 48 and 49 are secured to the downwardly stepped front sections 16 of the cowl by screws 51 and 52, respectively. The nozzle assemblies 48 and 49 project through corresponding holes in the upright portion of the downwardly stepped section of the cowl and each assembly is in registration with one of the air openings 17. The nozzle assemblies 48 and 49 function to dispense cleaning fluid onto the windshield 12 into the path of movement of the oscillating wiper elements 23. The hoses 46 and 47 are connected to the nozzle assemblies 48 and 49, respectively, and provide fluid communication between the pump 38 and the nozzle assemblies 48 and 49.

When the hand switch 29 is operated to connect the battery 41 with the electric motor 37, the pump 38 is operated to draw cleaning fluid from the reservoir 33 and to discharge the cleaning fluid under pressure into the hose 43. The T-coupling connected to the end of the hose 43 directs the fluid under pressure to the hoses 46 and 47 which conduct the fluid to the nozzle assemblies 48 and 49, respectively. The cleaning fluid under pressure is discharged by the nozzle assemblies 48 and 49 in continuous streams of cleaning fluid which is deposited on the windshield 12. These streams will be continuous as long as the motor 37 is connected to the battery 41. Manual operation of the switch 29 to the off position terminates the washing action of the washer unit 22.

Since the fluid dispensing nozzle assemblies 48 and 49 are identical in construction and operation, the following detailed description is limited to the nozzle 48 which is illustrated in FIG. 2. The nozzle assembly 48 has angularly shaped tubular body 53 having an enlarged cylindrical head end 54. A metal clip 56 is clamped around the central section of the tubular body 53 on relative angularly disposed portions thereof so as to inhibit rotation of the tubular body 53 relative to the clip 56. The clip 56 has a slot 57 to accommodate the screw 51 which functions to secure the nozzle assembly to the stepped section 16 of the cowl.

A fluid dispensing resilient cap 58 formed from an elastic and deformable material, such as natural or synthetic rubber or plastic, is frictionally fitted over the head 54 of the tubular body 53. The cap 58 is in a fluid sealing relationship with the head end 54 and is rotatable on the head end to adjust the impact position of the stream of cleaning fluid on the windshield 12.

As shown in FIG. 3, the cap 58 has an enlarged cylindrical open end section 59 which extends about the cylindrical head end 54 and forms a fluid seal therewith. To prevent accidental removal of the head end 54 from the cylindrical section 59 of the cap 58, the inner peripheral surface of the sleeve section 59 has an annular groove 61 which cooperates with an annular bead or tongue 62 on the outer peripheral surface of the head end 54. This tongue and groove connection functions to locate and maintain the resilient cap 58 on the head end 54.

Integral with the sleeve section 59 is a cup-shaped head section 63 having an annular side wall 64 and a substantially semispherical wall 66. The side will 64 has a taper which progressively increases in thickness from the end wall to the sleeve section 59. The end wall 66 is of substantially a uniform thickness and has a radius of about one-half of the diameter of the sleeve section 59. The end wall 66 is formed with a fluid discharging orifice 67 having an axis extended outwardly about twenty to thirty degrees with respect to the axis of the cap and positioned offset from the center of the end wall about one-half the arcuate distance to the side wall 64.

As shown in FIG. 4, rotation of the cap 58 on the head end 54 angularly moves the orifice 67 as indicated by the arrow 68. The changed position of the orifice 67 adjusts both the vertical and lateral position of the discharge stream of cleaning fluid with the result that the impact of cleaning fluid on the windshield 12 may be altered without changing the position of the nozzle assembly on the cowl 14. This adjustment may be accomplished during the dispensing of cleaning fluid onto the windshield thus eliminating a time consuming trial and error method of adjustment.

The durometer value or elastic properties of the rubber of the cap 58 is correlated with the thickness of the end wall 66 and with the number and size of fluid dispensing orifices 67 therein to maintain a relatively constant fluid pressure in the pressure chamber 69 formed by the cup-shaped head section 63. Fluid pressure in the chamber 69 depends on the pressure capacity of the pump 38 and the discharge capacity of the fluid discharging orifice 67. As long as the fluid discharging orifice 67 is not obstructed the pressure in the chamber 69 is at a substantially uniform value.

Figure 5:
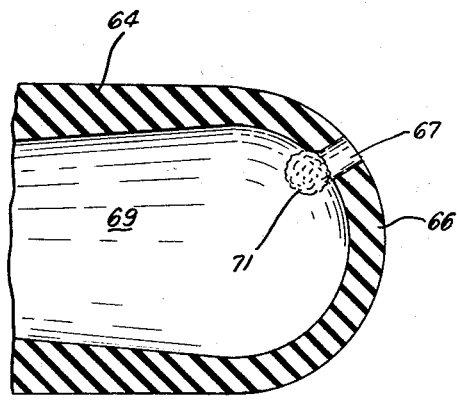
FIG. 5 is an enlarged sectional view of the discharge end section of the flexible cap of the nozzle assembly of FIG. 3 showing the fluid discharge orifice clogged or closed by a particle of dirt.
Figure 6:
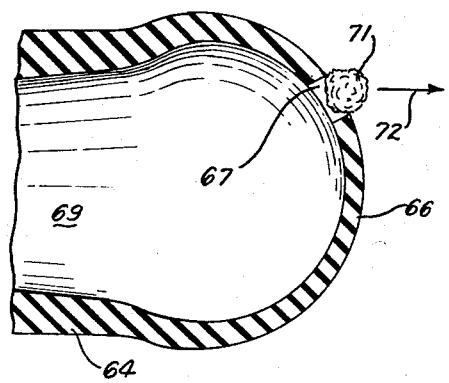
FIG. 6 is illustrated similar to FIG. 5 and shows the particle of dirt being discharged through the fluid discharge orifice.

Should the fluid discharging orifice 67 become clogged or blocked with solid material 71 as shown in FIG. 5, such as dirt, the pressure in the chamber 69 will increase above the normal operating pressure due to the decrease in the discharge capacity of orifice 67. The increase in pressure in the chamber 69 radially expands the annular side wall 64 and the end wall 66 with a resultant increase in the diameter of the discharge orifice 67. Enlargement of the discharge orifice 67 as shown in FIG. 6, coupled with the increase in the cleaning fluid pressure in the chamber 69 ejects the solid material 71 from the cap in a violent and positive manner in the direction of the arrow 72. Thus, the elastic cap 58 functions to automatically purge the cleaning fluid system of solid material which inhibits the proper dispensing of washing fluid onto the windshield.

After the solid material 71 has been expelled from the cap 58 the fluid pressure in the chamber 69 returns to a normal operating pressure causing the deformed end wall 66 and the annular side wall 64 to return to their normal shape, whereby the diameter of the orifice 67 is reduced back to its normal operating size.

Figure 7:
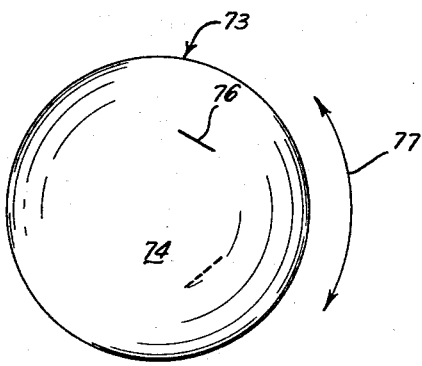
FIG. 7 is an end elevational view of a flexible cap similar to FIG. 4 having a modified fluid dispensing opening.

Referring to FIG. 7, there is shown an end view of an elastic and deformable cap 73 which is similar to the cap 58 except that the end wall 74 is formed with a slit 76. The slit 76 extends in a direction normal to a radius of the end wall 74 and is located in an off-center position. The adjacent side walls of the slit 76 are normally in engagement with each other. Subjecting the cap 73 to fluid pressure of the windshield washer cleaning fluid opens the slit in a direction radially of the end wall 74 whereby the cleaning fluid is discharged as a stream of fluid onto the windshield.

On rotation of the cap 73 as indicated by the arrow 77 the off-center relationship of the slit 76 varies the angular position of the slit for altering the impact position of the cleaning fluid on the windshield. The adjustment may be performed during the dispensing of cleaning fluid on the windshield.

Figure 8:
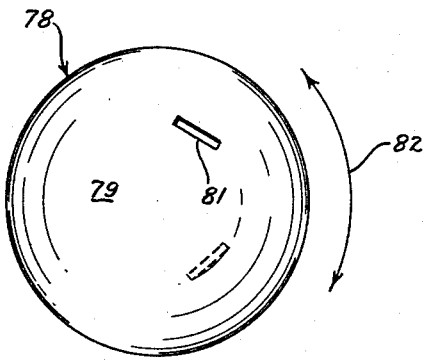
FIG. 8 is an end elevational view of a flexible cap similar to FIG. 4 of a resilient cap illustrating a further modification of the fluid discharge opening.

Referring to FIG. 8, there is shown an elastic and deformable cap 78 which is similar in construction to the cap 58, except for the end wall 79 being formed with a rectangular-shaped slot 81 extended normal to the radius of the end wall. In order to provide for the adjustment of of the stream of cleaning fluid discharged through the slot 81, the slot is located in an off-center position in the end wall 79. This adjustment is achieved by rotating the elastic deformable cap 78 on its support in the direction of the arrow 82. The slot 81 functions to discharge a ribbon of cleaning fluid which results in a wider range of water distribution on the windshield.

Figure 9:
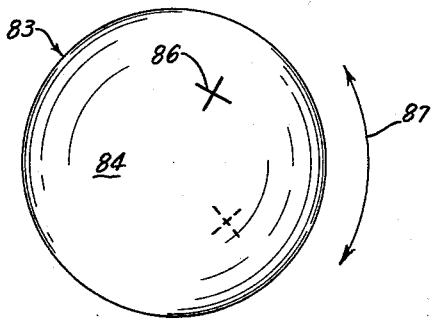
FIG. 9 is an end elevational view of a flexible cap similar to FIG. 4 of a resilient cap illustrating another modification of the fluid discharge opening.

Referring to FIG. 9, there is shown an end view of an elastic deformable cap 83 which is identical to the cap 68 illustrated in detail in FIG. 3 except for having a fluid discharge opening 86 of a cross-shape formed in the end wall 84. To provide for the adjustment of the stream of cleaning fluid discharged through the opening 86, the opening 86 is located in an off-center position in the end wall 84. This adjustment is accomplished by rotating the cap 83 on its tubular support in the direction of the arrow 87.

The cross-shape design of the orifice 86 forms four separate segmental portions in the flexible end wall 84 which are bent outwardly in response to an increase of the pressure of the cleaning fluid in the nozzle. The opening formed between the segmental portions also expands radically with the end walls 84 in response to an increase of the pressure in the nozzle thereby increasing the size of the fluid discharge orifice 8.

In operation the stream of cleaning fluid resulting from the cross-shape opening 86 diverges in a direction toward the windshield so as to strike the windshield in a broad pattern. This broad distribution of cleaning fluid on the windshield improves the cleaning action of the wiper elements.

In summary, the windshield washer unit 22 has a pair of substantially identical fluid dispensing nozzle assemblies 48 and 49 which function to direct streams of cleaning fluid onto the windshield 12. The nozzle assemblies 48 and 49 are mounted on the cowl 13 of the vehicle by screws 51 and 52 which permit an initial adjustment of the nozzle assembly relative to the cowl whereby the impact position of the cleaning fluid of the windshield may be adjusted.

Each of the nozzle assemblies 48 and 49 includes an elastic and deformable cap formed with at least one fluid discharge opening offset from the center of the nozzle. The final adjustment of the impact position of the cleaning fluid on the windshield 12 is achieved by rotating the cap with respect to its support. The rotation of the cap changes the angular position of the fluid discharging opening with the result that the position of the stream of cleaning fluid discharged by the cap is changed with respect to the windshield 12.

The resilient cap of each nozzle assembly has a substantially thin and semispherical end wall which functions to automatically maintain a predetermined fluid pressure in the chamber formed by the cap. An increase in the pressure in this chamber radically expands the end wall of the cap with the result that the size of the fluid discharge opening is increased thereby permitting the dislodgement and expelling of nozzle clogging foreign material from the nozzle assemblies 48 and 49.

While there have been shown, described, and pointed out the fundamental novel features of the invention, it will be understood that various omissions, substitutions, changes in form, and details of the apparatus illustrated may be made by those skilled in the art without departing from the spirit of the invention which is intended to be limited only as indicated by the scope of the following claims.

I claim:

1. A nozzle assembly for a windshield washer unit operable to direct cleaning fluid onto the windshield of a vehicle comprising:
    (a) a tubular body member mountable on a vehicle forward of the windshield, said body member having an end section projected toward the windshield, and
    (b) a hollow resilient means having a sleeve section mounted on said end section of the tubular body member and a cup-shaped head section, said head section having an annular side wall integral with the sleeve section and a substantially semi-spherical end wall formed with at least one fluid discharge opening, said opening positioned off-center from the longitudinal axis of the resilient means whereby upon rotation of said resilient means on said end section about said longitudinal axis the position of the cleaning fluid on the windshield may be adjusted, said annular side wall having a taper which progressively increases in thickness from the end wall to the sleeve section whereby upon application of fluid pressure to the nozzle assembly the end wall will deform outwardly and radially to increase the size of the fluid discharging opening.

2. A nozzle assembly for a windshield washer unit operable to direct cleaning fluid onto the windshield of a vehicle comprising:
    (a) a tubular body member having relative angularly disposed sections and a head end directed toward the windshield,
    (b) bracket means clamped over at least two of said sections for mounting the nozzle assembly on the vehicle forward of the windshield,
    (c) fluid discharge means telescoped over said head end of the body member for rotation thereon, said means having a resilient end wall formed with at least one off-center fluid discharge opening to direct fluid onto said windshield, and
    (d) said fluid discharge means having a sleeve section mounted about said head end,
    (e) said sleeve section integral with said end wall and having a longitudinal axis extended through said end wall, and
    (f) said fluid discharge means being rotatable about said tubular body member and about said longitudinal axis for vertical and lateral adjustment of said fluid discharge opening.

References Cited by the Examiner

UNITED STATES PATENTS

| 2,114,558 | 4/1938 | Dismukes | 239—284 |
| 2,373,555 | 4/1945 | Folke | 239—602 |
| 2,443,560 | 6/1948 | Goodson | 128—252 |
| 2,495,548 | 1/1950 | Revane | 128—252 |
| 2,961,168 | 11/1960 | Webb | 239—284 |
| 3,008,649 | 11/1961 | Bock et al. | 239—284 |
| 3,199,787 | 8/1965 | Oishei et al. | 239—534 X |

FOREIGN PATENTS

| 916,249 | 8/1954 | Germany. |
| 759,759 | 10/1956 | Great Britain. |
| 810,270 | 3/1959 | Great Britain. |
| 832,418 | 4/1960 | Great Britain. |
| 309,751 | 11/1955 | Switzerland. |

M. HENSON WOOD, JR., *Primary Examiner.*

EVERETT W. KIRBY, *Examiner.*

D. L. MOSELEY, V. C. WILKS, *Assistant Examiners.*